United States Patent
Lee et al.

(10) Patent No.: US 9,853,294 B2
(45) Date of Patent: Dec. 26, 2017

(54) SECONDARY BATTERY AND MANUFACTURING METHOD THEREOF

(71) Applicant: Samsung SDI Co., Ltd., Yongin-si, Gyeonggi-do (KR)

(72) Inventors: Junyong Lee, Yongin-si (KR); Huijun Lee, Yongin-si (KR); Seungyeol Yoo, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 357 days.

(21) Appl. No.: 14/183,311

(22) Filed: Feb. 18, 2014

(65) Prior Publication Data

US 2015/0111090 A1 Apr. 23, 2015

(30) Foreign Application Priority Data

Oct. 17, 2013 (KR) .................. 10-2013-0124068

(51) Int. Cl.
*H01M 4/78* (2006.01)
*B23K 26/30* (2014.01)
*H01M 2/26* (2006.01)

(52) U.S. Cl.
CPC ............. *H01M 4/78* (2013.01); *H01M 2/266* (2013.01); *Y10T 29/49108* (2015.01)

(58) Field of Classification Search
CPC .......... H01M 4/78; H01M 2/266; H01M 4/64; H01M 4/70; H01M 2/263; B23K 26/60; Y10T 29/49108
See application file for complete search history.

(56) References Cited

U.S. PATENT DOCUMENTS

| 7,781,095 B2 * | 8/2010 | Cho | H01M 2/263 429/161 |
| 2006/0051664 A1 * | 3/2006 | Tasai | H01M 2/266 429/161 |

(Continued)

FOREIGN PATENT DOCUMENTS

| JP | 10-261441 A | 9/1998 |
| JP | 2007-299536 A | 11/2007 |

(Continued)

OTHER PUBLICATIONS

English Machine Translation of Japanese Patent No. 10-261441 A, published on Sep. 29, 1998, 22 pages.

(Continued)

*Primary Examiner* — Milton I Cano
*Assistant Examiner* — Michael Dignan
(74) *Attorney, Agent, or Firm* — Lewis Roca Rothgerber Christie LLP (57) ABSTRACT

A secondary battery includes an electrode assembly having a relatively large capacity due to reducing a width of an uncoated portion and increasing a width of a coated portion by improving welding strength through a combination of ultrasonic welding and laser welding, and a manufacturing method thereof. The manufacturing method of the secondary battery includes preparing at least one electrode assembly including an uncoated portion, provisionally welding the uncoated portion by ultrasonic welding, coupling a current collector having an elastic property to the provisionally welded uncoated portion, and welding the uncoated portion and the current collector by laser welding.

6 Claims, 9 Drawing Sheets

(56) References Cited

U.S. PATENT DOCUMENTS

| | | | |
|---|---|---|---|
| 2011/0195286 A1 | 8/2011 | Aota et al. | |
| 2012/0015235 A1* | 1/2012 | Fuhr | H01M 2/027 429/158 |
| 2013/0122355 A1* | 5/2013 | Kim | H01M 2/027 429/179 |
| 2015/0107752 A1* | 4/2015 | Olsson | B29C 69/001 156/73.1 |

FOREIGN PATENT DOCUMENTS

| | | |
|---|---|---|
| JP | 2011-165437 A | 8/2011 |
| KR | 10-1223516 B1 | 1/2013 |

OTHER PUBLICATIONS

English Machine Translation of Japanese Patent No. 2007-299536 A, published on Nov. 15, 2007, 36 pages.
KIPO Office action dated Mar. 31, 2016, for Korean priority Patent application 10-2013-0124068, (6 pages).

\* cited by examiner

SECONDARY BATTERY AND MANUFACTURING METHOD THEREOF

CROSS-REFERENCE TO RELATED APPLICATION

This application claims priority to and the benefit of Korean Patent Application No. 10-2013-0124068 filed on Oct. 17, 2013, in the Korean Intellectual Property Office, the disclosure of which is incorporated in its entirety herein by reference.

BACKGROUND

1. Field

Embodiments of the present invention relate to a secondary battery and a manufacturing method thereof.

2. Description of the Related Art

Unlike primary batteries, secondary batteries are rechargeable. Types of secondary batteries include a low capacity battery including a battery cell in the form of a pack and typically used for small portable electronic devices such as cellular phones and camcorders, and a high capacity battery including dozens of battery cells connected to one another and typically used as a motor-driving power source for electric scooters, hybrid vehicles, or electric vehicles.

Secondary batteries are manufactured in various shapes such as a cylindrical shape and a prismatic shape. A secondary battery is typically constructed as follows: an electrode assembly formed by inserting an insulating separator between positive and negative electrode plates is placed in a case together with electrolyte; and a cap plate is placed on the case. The electrode assembly is connected to positive and negative terminals, which protrude from the cap plate and are exposed to the exterior of the secondary battery.

SUMMARY

Aspects of the present invention are directed towards a secondary battery, which includes an electrode assembly having a relatively large capacity due to reducing a width of an uncoated portion and increasing a width of a coated portion by securing welding strength of the uncoated portion through a combination of ultrasonic welding and laser welding, and a manufacturing method thereof.

According to at least one of the embodiments, there is provided a manufacturing method of a secondary battery, the manufacturing method including preparing at least one electrode assembly including an uncoated portion, provisionally welding the uncoated portion by ultrasonic welding, coupling a current collector having an elastic property to the provisionally welded uncoated portion, and welding the uncoated portion and the current collector by laser welding.

The uncoated portion may be constructed by stacking a plurality of uncoated portions, and the plurality of uncoated portions may be provisionally welded by ultrasonic welding.

The uncoated portion may have a width of approximately 2 mm or less.

The current collector may include at least one body part facing an end of the uncoated portion, a pair of elastic parts extending from both ends of one side of the body part and bent to extend toward each other and toward an extension line corresponding to the center of the body part, and a pair of coupling parts extending from the elastic parts and directly contacting opposite side surfaces of the uncoated portion.

The provisionally welded uncoated portion may be coupled and welded to the coupling parts.

The coupling parts may be coupled to the uncoated portion and may press on the opposite side surfaces of the uncoated portion.

The current collector may include as many body parts as there are electrode assemblies in the secondary battery.

The uncoated portion and the current collector may be laser welded to each other using laser beams irradiated in a direction perpendicular to the end of the uncoated portion.

According to at least one of embodiments, there is provided a secondary battery including at least one electrode assembly including an uncoated portion, a current collector having an elastic property coupled to the uncoated portion, and a case accommodating the uncoated portion, wherein the uncoated portion is laser welded to coupling parts of the current collector.

The uncoated portion may be constructed by stacking a plurality of uncoated portions, and the plurality of uncoated portions may be provisionally welded by ultrasonic welding.

The provisionally welded uncoated portions may directly contact the coupling parts.

The uncoated portion may have a width of approximately 2 mm or less.

The current collector may include at least one body part facing an end of the uncoated portion, a pair of elastic parts extending from both ends of one side of the body part and bent toward an extension line corresponding to the center of the body part to get close to each other, and the coupling parts comprising a pair of coupling parts extending from the elastic parts and directly contacting opposite side surfaces of the uncoated portion.

The coupling parts may press on the opposite side surfaces of the uncoated portion.

The current collector may include as many body parts as there are electrode assemblies in the secondary battery.

The current collector may be laser welded to each other using laser beams irradiated in a direction perpendicular to the end of the uncoated portion.

As described above, in the secondary battery and the manufacturing method thereof according to the present invention, welding strength can be improved through a combination of ultrasonic welding and laser welding, thereby providing the secondary battery, which includes an electrode assembly having a relatively large capacity by reducing a width of an uncoated portion to be coupled to a current collector to approximately 2 mm or less and increasing a width of a coated portion.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain principles of the present disclosure. In the drawings.

DETAILED DESCRIPTION

Hereinafter, some exemplary embodiments are described in further detail with reference to the accompanying drawings.

Some exemplary embodiments of the present invention are described more fully hereinafter with reference to the accompanying drawings; however, embodiments of the present invention may be embodied in different forms and should not be construed as limited to the embodiments set forth herein. As those skilled in the art would realize, the described embodiments may be modified in various different ways, all without departing from the spirit or scope of the present invention. Accordingly, the drawings and description are to be regarded as illustrative in nature and not restrictive.

In the drawings, thicknesses of layers and regions may be exaggerated for clarity. Like numbers refer to like elements throughout. As used herein, the term "and/or" includes any and all combinations of one or more of the associated listed items.

The terminology used herein is for the purpose of describing particular embodiments and is not intended to be limiting of the invention. As used herein, singular forms are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that, although the terms "first," "second," etc. may be used herein to describe various members, elements, regions, layers, and/or parts, these members, elements, regions, layers, and/or parts should not be limited by these terms. These terms are merely used to distinguish one member, element, region, layer, and/or part from another member, element, region, layer, and/or part. Thus, for example, a first member, element, region, layer, and/or part discussed below could be termed a second member, element, region, layer, and/or part without departing from the teachings of the present invention. Expressions such as "at least one of" and "one of," when preceding a list of elements, modify the entire list of elements and do not modify the individual elements of the list. Further, the use of "may" when describing embodiments of the present invention refers to "one or more embodiments of the present invention."

Hereinafter, a configuration of a secondary battery according to an embodiment of the present invention will be described in detail with reference to the accompanying drawings.

Figure 1:
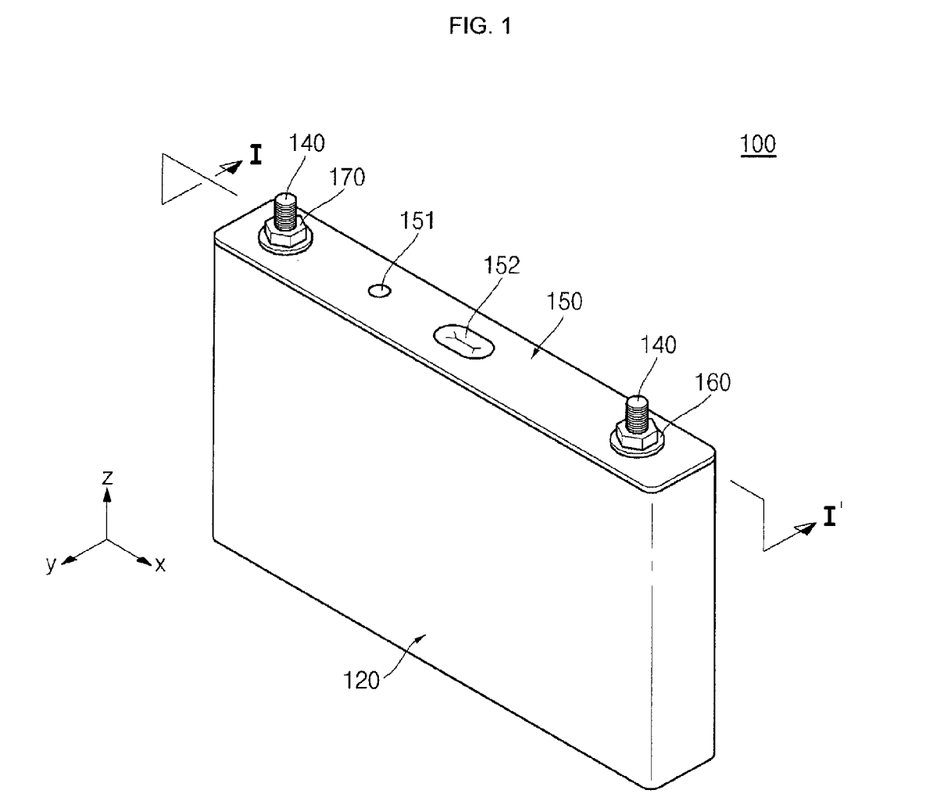
FIG. 1 is a perspective view illustrating a secondary battery according to an embodiment of the present invention.
Figure 2:
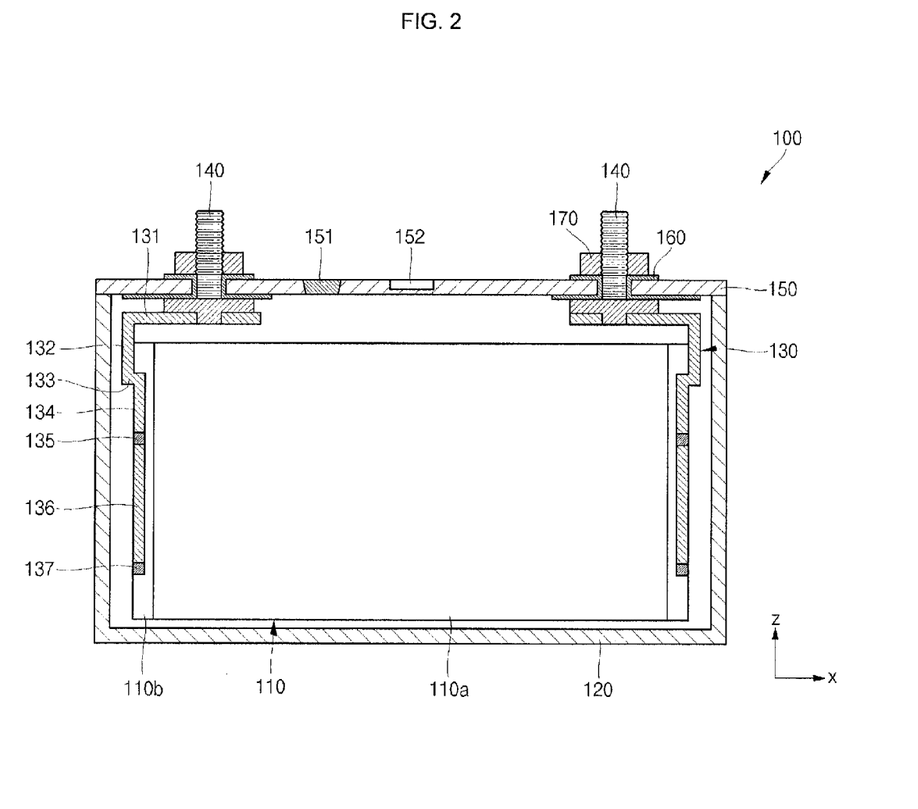
FIG. 2 is a sectional view of the secondary battery taken along line I-I' of FIG. 1.
Figure 3:
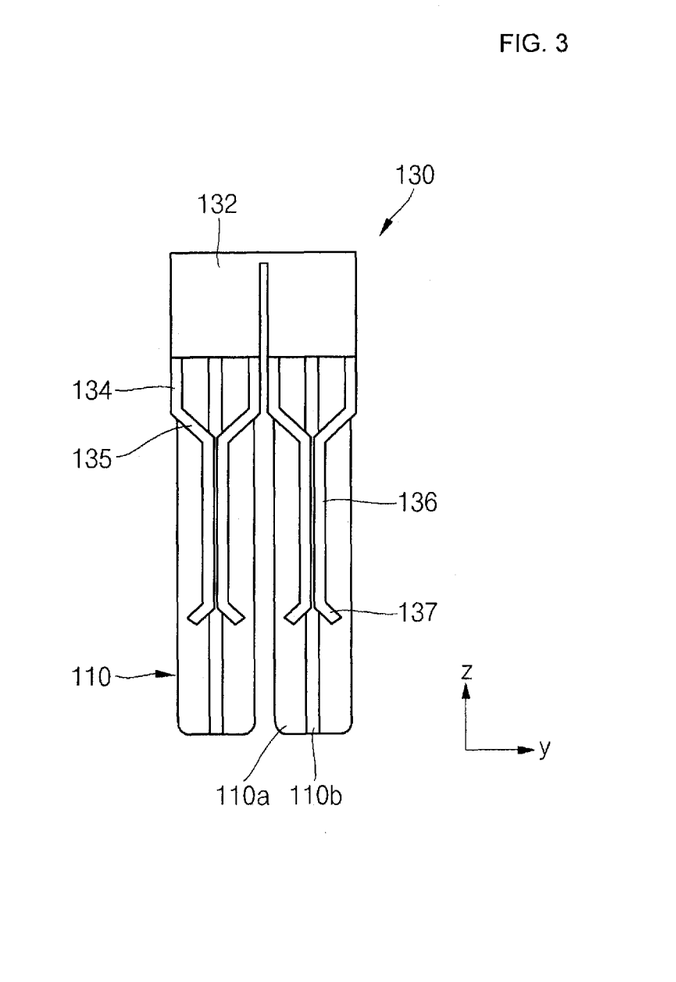
FIG. 3 is a side view illustrating a state in which an electrode assembly and a current collector shown in FIG. 1 are coupled to each other.
Figure 4:
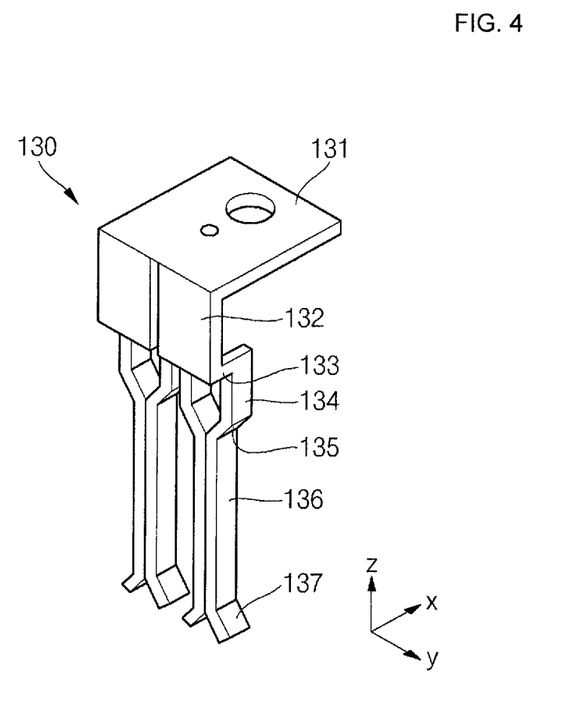
FIG. 4 is a perspective view of a current collector in the secondary battery shown in FIG. 1, according to an embodiment of the present invention.

FIG. 1 is a perspective view illustrating a secondary battery according to an embodiment of the present invention, FIG. 2 is a sectional view of the secondary battery taken along line I-I' of FIG. 1, FIG. 3 is a side view illustrating a state in which an electrode assembly and a current collector shown in FIG. 1 are coupled to each other, and FIG. 4 is a perspective view of a current collector in the secondary battery shown in FIG. 1, according to an embodiment of the present invention.

Referring to FIGS. 1 to 4, a secondary battery 100 according to a present embodiment includes an electrode assembly 110, a case 120 accommodating the electrode assembly 110, a current collector 130 coupled to the electrode assembly 110, a first and second electrode terminals 140 (to be labeled collectively, hereinafter) and a cap plate 150.

The electrode assembly 110 may be formed by winding or laminating a stacked structure including a first electrode plate, a second electrode plate, and a separator, which are shaped as a thin plate or a thin foil. The electrode assembly 110 is wound in a substantially jelly-roll configuration. The first electrode plate may function as a positive electrode, and the second electrode plate may function as a negative electrode. Conversely, the first electrode plate may function as a negative electrode, and the second electrode plate may function as a positive electrode. The first electrode plate is formed by applying a first active material to a first metal foil, and an uncoated portion is formed on a region where the first active material is not formed. When the first electrode plate is a positive electrode, the first metal foil may be aluminum and the first active material may be a lithium-based oxide. In some embodiments, the second electrode plate is formed by applying a second active material to a second metal foil, and an uncoated portion is formed on a region where the second active material is not located. When the second electrode plate is a negative electrode, the second metal foil may be copper and the second active material may be graphite. However, the present invention is not limited to the materials of the first and second electrode plates and the first and second active materials to those listed herein. The separator may be located between the first electrode plate and the second electrode plate for preventing a short-circuit therebetween and for allowing movement of lithium ions. The separator may be formed of, for example, polyethylene (PE), polypropylene (PP), a composite film of PE and PP, and/or the like. However, the material of the separator is not limited thereto.

At least one electrode assembly 110 is provided and is accommodated in the case 120 with an electrolytic solution. In the illustrated embodiment, two electrode assemblies 110 are exemplified. However, aspects of the present invention are not limited to the number of the electrode assemblies 110 disclosed herein. The electrolytic solution may include an organic solvent, such as ethylene carbonate (EC), propylene carbonate (PC), diethyl carbonate (DEC), ethyl methyl carbonate (EMC), dimethyl carbonate (DMC), or a lithium salt, such as $LiPF_6$ or $LiBF_4$, and/or the like. The electrolytic solution may be a liquid, a solid, and/or a gel electrolyte.

In some embodiments, the electrode assembly 110, formed by winding the electrode plates, includes a coated portion 110a coated with an active material and uncoated portions 110b without the active material coated thereon. The uncoated portions 110b are positioned at opposite edges of the coated portion 110a of the electrode assembly 110. The uncoated portions 110b positioned at the opposite edges of the coated portion 110a correspond to a first electrode and a second electrode, respectively. If a plurality of electrode assemblies 110 are provided, the electrode assemblies 110 may be arranged such that uncoated portions 110b corresponding to the same electrode are positioned in the same direction. In some embodiments, electrodes of the secondary battery 100 are formed by a pair of current collectors 130 connected to the respective uncoated portions 110b positioned at opposite edges of the electrode assembly 110. In one embodiment, if the plurality of electrode assemblies 110 are provided, the uncoated portions 110b corresponding to the same electrode are positioned in the same direction and are coupled together to one current collector 130 The uncoated portions 110b may have a width of approximately 2 mm or less. In other words, a distance between each of the opposite edges of the coated portion 110a and each of the opposite edges of the electrode assembly 110 may be approximately 2 mm or less. Since each of the uncoated portions 110b has a relatively small width, the coated portion 110a may have a relatively large width. Thus, the electrode assembly 110 having a larger capacity, compared to the conventional electrode assembly, can be attained. Alternatively, the electrode assembly 110 reduced in size while having the same capacity can be attained by reducing only the width of each of the uncoated portions 110b.

According to some embodiments of the present invention, the uncoated portions 110b are coupled to the current collector 130 by laser welding. Since the electrode assembly 110 is formed by laminating or winding a plurality of electrode plates, a plurality of uncoated portions 110b may be provided. The plurality of uncoated portions 110b are provisionally welded by ultrasonic welding before they are coupled to the current collector 130. The uncoated portions 110b are temporarily fixed by the provisional welding to later be easily coupled to the current collector 130. In one embodiment, the provisionally welded uncoated portions 110b and the current collector 130 are welded to each other and oriented in parallel. In some embodiments, the uncoated portions 110b and the current collector 130 are welded to each other using laser beams irradiated in a direction (x axis direction) perpendicular to the ends of the uncoated portions 110b, that is, perpendicular to the edges of the electrode assembly 110. Therefore, the uncoated portions 110b formed in the plurality of electrode assemblies 110 may be electrically connected to each other by the current collector 130.

The case 120 has a substantially rectangular parallelepiped shape having an inner receiving space and a top opening. In more detail, the case 120 includes two wide side surfaces, two narrow side surfaces, a bottom surface and the opening. Since the case 120 and the cap plate 150 are coupled to each other, it will be appreciated that the case 120 has a substantially opened portion configured to accommodate the periphery of the cap plate 150. The case 120 accommodates the electrode assembly 110 and an electrolytic solution in its receiving space. In one embodiment, the uncoated portions 110b of the electrode assembly 110 are positioned to face the two narrow side surfaces, respectively. The case 120 may be formed of one selected from the group consisting of aluminum, copper, iron, stainless steel (SUS), ceramic, polymer or equivalents thereof, but is not limited thereto. In addition, the case 120 may be electrically connected to one of the first and second electrode plates of the electrode assembly 110. In other words, the case 120 may have a polarity, for example, a positive polarity or a negative polarity.

The current collectors 130 are provided in pairs, and each current collector 130 is connected to one of the uncoated portions 110b, positioned at opposite edges of the coated portion 110a. In the embodiments where a plurality of electrode assemblies are provided, one of the current collectors 130 includes a plurality of coupling parts 136 to be connected with the uncoated portions 110b having the same polarity and positioned in the same direction. Since two electrode assemblies 110 are illustrated in the embodiment of the present invention, two coupling parts 136 are formed so as to allow the uncoated portions 110b having the same polarity to be connected to one current collector 130. However, the present invention is not limited to the number of the coupling parts 136 to that disclosed herein. In some embodiments, the current collector 130 is formed of an elastic material.

The current collector 130 includes a plate part 131 extending in a horizontal direction (x axis direction) of the electrode assembly 110, a body part 132 bent from the plate part 131 in a substantially perpendicular direction (z axis direction), a pair of first bent parts 133 bent from both ends of one side of the body part 132 toward the electrode assembly 110, a pair of second bent parts 134 perpendicularly bent from the pair of first bent parts 133, a pair of elastic parts 135 bent from the pair of second bent parts 134 to extend towards each other, a pair of coupling parts 136 extending from the pair of elastic parts 135 to be parallel to the uncoated portions 110b, and a pair of extension parts 137 bent from the pair of coupling parts 136 to extend away from each other.

The plate part 131 is in a shape of a substantially planar plate and is horizontally formed on the electrode assembly 110 in a lengthwise direction of the electrode assembly 110. One side of the plate part 131 is connected to the electrode terminal 140 and the other side of the plate part 131 is connected to the body part 132. A terminal hole is formed on one side of the plate part 131 and the electrode terminal 140 passing through the terminal hole and the cap plate 150 may protrude and extend from the one side of the plate part 131.

The body part 132 is vertically bent from the side of the plate part 131 not connected to the electrode terminal 140 to then extend in parallel to the edge of the electrode assembly 110. In one embodiment, the body part 132 may include a plurality of body parts according to the number of the electrode assemblies 110. For example, since two electrode assemblies 110 are exemplified in the illustrated embodiment of the present invention, two body parts 132 may be formed accordingly. However, the present invention is not limited to the number of the body parts 132 disclosed herein. The body part 132 is positioned at a region corresponding to the end of each of the uncoated portions 110b to face the uncoated portions 110b.

The first bent parts 133 are vertically bent from both ends of the lower side of the body part 132 toward the electrode assembly 110. Therefore, the current collector 130 can be inserted into and coupled to the uncoated portions 110b. In addition, the second bent parts 134 are vertically bent from the bent parts 133 in a direction away from the plate part 131. The first and second bent parts 133 and 134 may be provided in pairs.

The elastic parts 135 are bent from the pair of second bent parts 134 to contact opposite side surfaces of the uncoated portions 110b. In one embodiment, the elastic parts 135 may also be provided as a pair. In other words, the pair of elastic parts 135 are formed to be close to each other, extending toward the extension line corresponding to the center of the body part 132. The elastic parts 135 are parts of the current collector 130 which are formed of an elastic material. Thus, the current collector 130 and the uncoated portions 110b may be effectively coupled to each other by the force exerted by the elastic parts 135.

The coupling parts 136 extend from the pair of elastic parts 135 in a direction. (z axis direction) parallel to the opposite side surfaces of the uncoated portions 110b. The coupling parts 136 are also provided as a pair. When the current collector 130 is coupled to the uncoated portion 110b, the coupling parts 136 make direct contact with the opposite side surfaces of the uncoated portion 110b. In other words, the coupling parts 136 press on the uncoated portions 110b from the opposite side surfaces of the uncoated portions 110b with the force exerted by the elastic parts 135. Therefore, the uncoated portions 110b are further compressed by the coupling parts 136 to then be brought into closer contact with each other, thereby minimizing a gap between the uncoated portions 110b.

The extension parts 137 are bent in a direction away from the pair of coupling parts 136. Here, the extension parts 137 may also be provided as a pair. The pair of extension parts 137 are formed to extend away from each other and away from the extension line corresponding to the center of the body part 132. The extension parts 137 may widen the distance between the coupling parts 136 when the current collector 130 and the uncoated portions 110b are coupled to each other. Thus, a space may be formed between the coupling parts 136 by pulling the extension parts 137 in opposite directions, and the uncoated portions 110b are then inserted into the space between the coupling parts 136, thereby coupling the uncoated portions 110b and the current collector 130 to each other.

After the current collector 130 and the uncoated portions 110b are coupled to each other, laser welding is performed between the current collector 130 and the uncoated portions 110b. In some embodiments, the uncoated portions 110b and the coupling parts 136 are coupled to each other by laser welding. Here, the coupling parts 136 and the uncoated portions 110b are laser welded to each other using laser beams irradiated in a direction (x axis direction) perpendicular to the ends of the uncoated portions 110b. Here, since the uncoated portions 110b are provisionally welded to each other, and the coupling parts 136 press on the opposite side surfaces of the uncoated portions 110b, formation of the gap between the uncoated portions 110b can be suppressed. Therefore, it is possible to substantially prevent laser beams from penetrating into the electrode assembly 110 during laser welding. In addition, the current collector 130 and the uncoated portions 110b are laser welded to each other in the direction perpendicular to the ends of the uncoated portions 110b, thereby easily achieving the coupling of the uncoated portions 110b and the coupling parts 136 even when each of the uncoated portions 110b is formed to have a width of approximately 2 mm or less. In addition, the coupling of the uncoated portions 110b and the current collector 130 is achieved by laser welding, thereby more firmly welding the uncoated portions 110b and the current collector 130 to each other.

The electrode terminal 140 is generally made of a metal or an equivalent thereof and includes first and second electrode terminals. In more detail, the electrode terminal 140 is coupled to the terminal hole of the plate part 131 to then protrude from the plate part 131 in the perpendicular direction (z axis direction). In addition, the electrode terminal 140 further protrudes upwardly from the cap plate 150. The electrode terminal 140 includes a screw thread provided on its outer circumferential surface to be coupled to a nut 170 engaged therewith.

According to some embodiments of the present invention, the cap plate 150 is formed on the case 120 to cover the opening of the case 120. The cap plate 150 seals the case 120 to prevent the electrolytic solution contained in the case 120 from leaking out. The cap plate 150 including the terminal hole allows the electrode terminal 140 to protrude upwardly from the cap plate 150. The cap plate 150 includes an injection hole to inject the electrolytic solution therethrough and a plug 151 closing the injection hole. In addition, the cap plate 150 includes a safety vent 152 formed at a substantially central area of the cap plate 150. When the internal pressure of the case 120 exceeds a reference pressure generated by gases inside the case 120 due to, e.g., overcharge, the safety vent 152 is configured to be opened earlier than the other area of the cap plate 150, thereby reducing a risk of explosion due to the increase in the internal pressure.

In some embodiments, an insulation member 160 is formed on top and bottom surfaces of the cap plate 150 and at a region corresponding to the terminal hole. In more detail, the insulation member 160 is formed at the periphery of the electrode terminal 140, thereby electrically insulating the cap plate 150 and the electrode terminal 140. In addition, the insulation member 160 extends from the periphery of the electrode terminal 140 to the top and bottom surfaces of the cap plate 150, thereby insulating the current collector 130 and the nut 170 coupled to the electrode terminal 140 from the cap plate 150. In some cases, the insulation member 160 may be formed to insulate only one of the first and second electrode terminals 140 from the cap plate 150. For example, when the insulation member 160 is not formed at the periphery of the first electrode terminal, the first electrode terminal and the cap plate 150 may directly contact each other. In one embodiment, the cap plate 150 or the case 120 may have the same polarity as the first electrode terminal.

In some embodiments, the nut 170 is coupled to the electrode terminal 140 above the cap plate 150. The screw thread of the nut 170 is engaged with a screw thread of the electrode terminal 140. The nut 170 is engaged with the electrode terminal 140 to fix the electrode terminal 140 to the cap plate 150. Therefore, the electrode assembly 110 coupled to the electrode terminal 140 through the current collector 130 is also position-fixed inside the case 120.

As described above, in the secondary battery 100 according to the present embodiment of the present invention, welding strength between the uncoated portions 110b and the current collector 130 can be improved through a combination of ultrasonic welding and laser welding. In more detail, the uncoated portions 110b are provisionally welded by ultrasonic welding to be provisionally fixed, and then coupled to the elastic current collector 130, followed by welding the uncoated portions 110b to the current collector 130 by laser welding. In one embodiment, the coupling parts 136 press on the opposite side surfaces of the uncoated portions 110b with the force exerted by the elastic parts 135, thereby further compressing the uncoated portions 110b. Therefore, since the formation of the gap between the uncoated portions 110b is suppressed, it is possible to substantially prevent laser beams from penetrating into the electrode assembly 110 and causing damages to the electrode assembly 110. In addition, since welding of the uncoated portions 110b and the current collector 130 is achieved by laser welding, the welding strength between the uncoated portions 110b and the current collector 130 can be further improved.

In such a manner, the secondary battery 100 according to the present embodiment of the present invention can improve the welding strength, thereby reducing the width of each of the uncoated portions 110b to be coupled to the current collector 130 to approximately 2 mm or less. In other words, according to the present invention, the secondary battery 100 having a relatively large capacity can be manufactured by forming the uncoated portions 110b each having a relatively small width and forming the coated portion 110a having a relatively large width. Alternatively, the secondary battery 100 reduced in size while having the same capacity can be attained by reducing only the width of each of the uncoated portions 110b.

Hereinafter, the manufacturing method of the secondary battery according to an embodiment of the present invention will be described.

Figure 5:
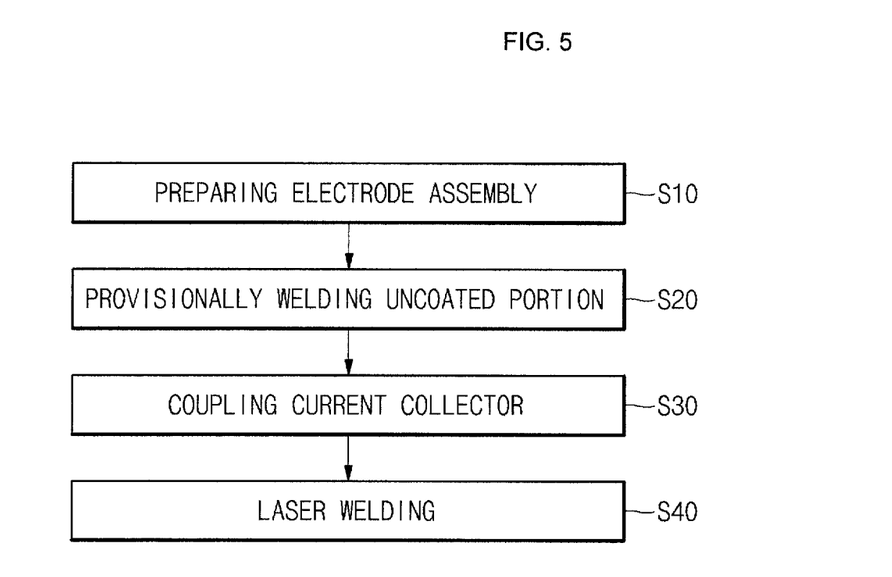
FIG. 5 is a flowchart illustrating a manufacturing method of a secondary battery according to an embodiment of the present invention.

FIG. 5 is a flowchart illustrating a manufacturing method of a secondary battery according to an embodiment of the present invention, and FIGS. 6A to 6F sequentially illustrate process steps of the manufacturing method of a secondary battery according to an embodiment of the present invention.

Figure 6A:
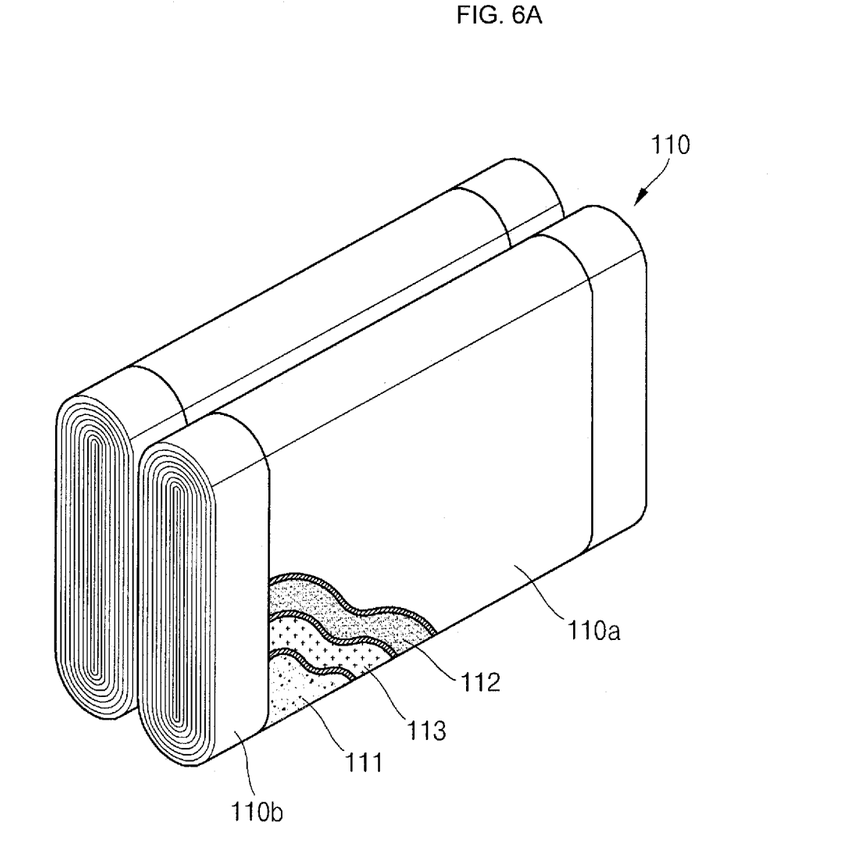
FIGS. 6A to 6F sequentially illustrate process steps of the manufacturing method of a secondary battery according to an embodiment of the present invention.

Referring to FIGS. 5 and 6A, the manufacturing method of the secondary battery according to an embodiment of the present invention includes preparing an electrode assembly 110 including an uncoated portion 110b (S10). The electrode assembly 110 is formed by winding or laminating a stacked structure including a first electrode plate 111, a separator 113 and a second electrode plate 112, which are shaped as a thin plate or a thin foil. The electrode assembly 110 formed by winding the electrode plates, includes a coated portion 110a coated with an active material and uncoated portions 110b without the active material coated thereon. Here, the uncoated portions 110b are positioned at opposite edges of the coated portion 110a of the electrode assembly 110. The uncoated portions 110b positioned at the opposite edges correspond to a first electrode and a second electrode, respectively. A width of each of the uncoated portions 110b may be approximately 2 mm or less. Since each of the uncoated portions 110b has a relatively small width, the coated portion 110a may have a relatively large width. Accordingly, the electrode assembly 110 having a relatively large capacity, compared to the conventional electrode assembly, can be attained.

In some embodiments, a plurality of electrode assemblies 110 may be provided. In this case, the electrode assemblies 110 are arranged such that the uncoated portions 110b of the same electrode are positioned in the same direction. In the embodiment of the present invention, two electrode assemblies 110 are illustrated, but aspects of the present invention are not limited thereto.

Figure 6B:
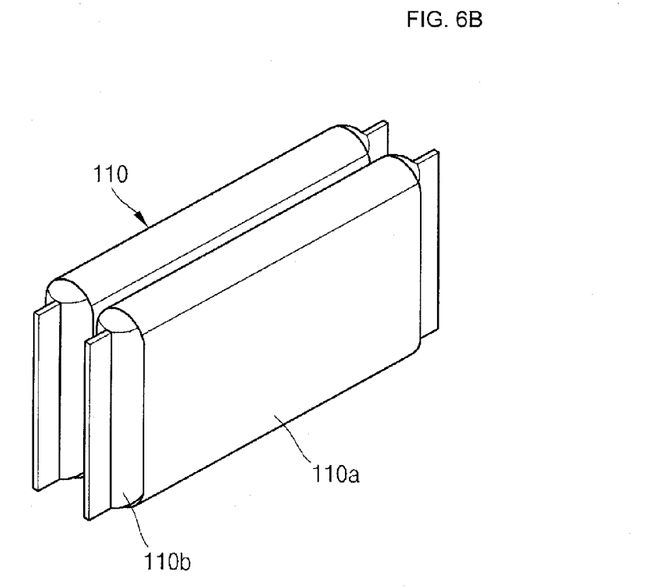
Figure 6C:
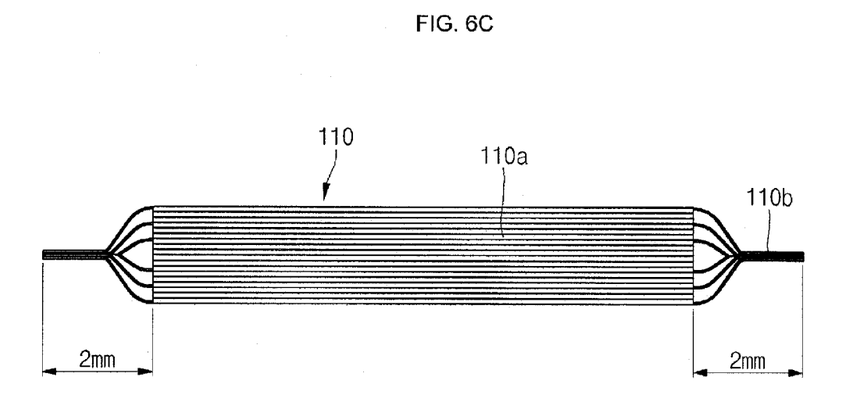

Referring to FIGS. 5, 6B and 6C, in step S20, the uncoated portion 110b is provisionally welded by ultrasonic welding. In particular, referring to FIG. 6C illustrating a cross-sectional view of the electrode assembly 110, since the electrode assembly 110 is formed by winding multiple electrode plates, the uncoated portion 110b may also include a plurality of uncoated portions. The plurality of uncoated portions are provisionally welded in the same manner as in step S20, so that they are brought into contact with each other and fixed. In other words, the uncoated portions 110b are temporarily fixed, thereby making the temporarily fixed uncoated portions 110b to later be easily coupled to the current collector 130.

Figure 6D:
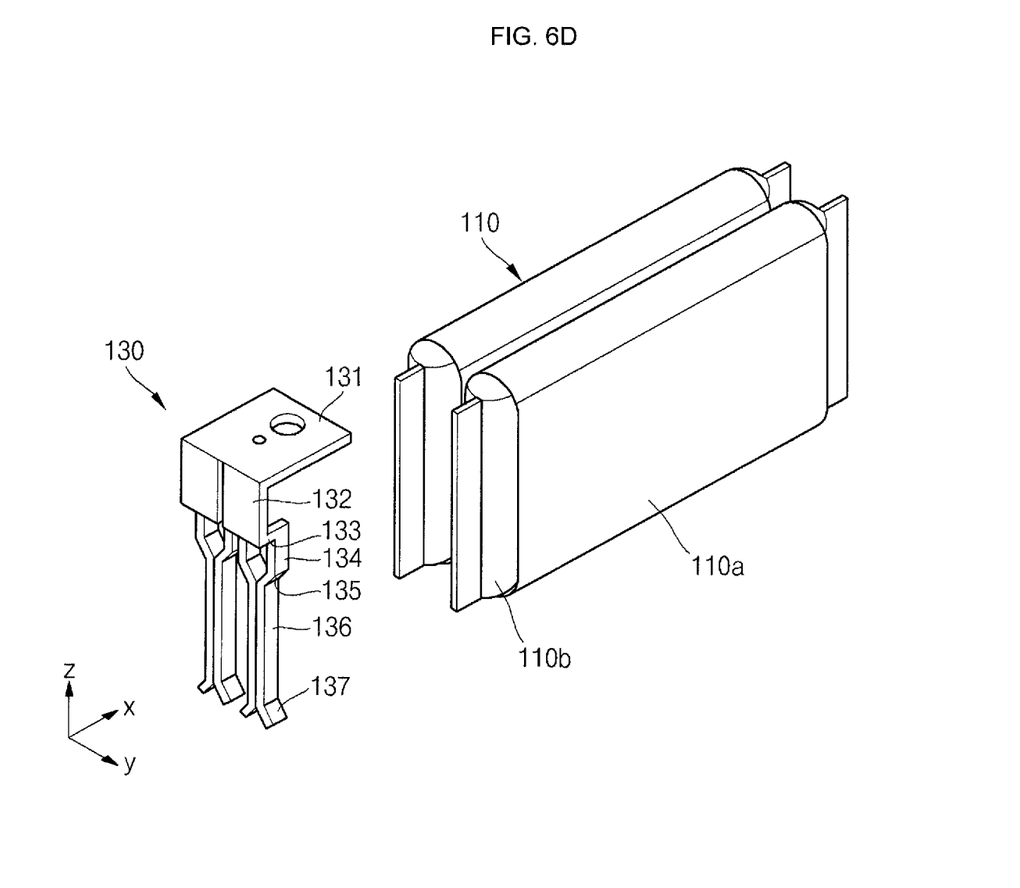
Figure 6E:
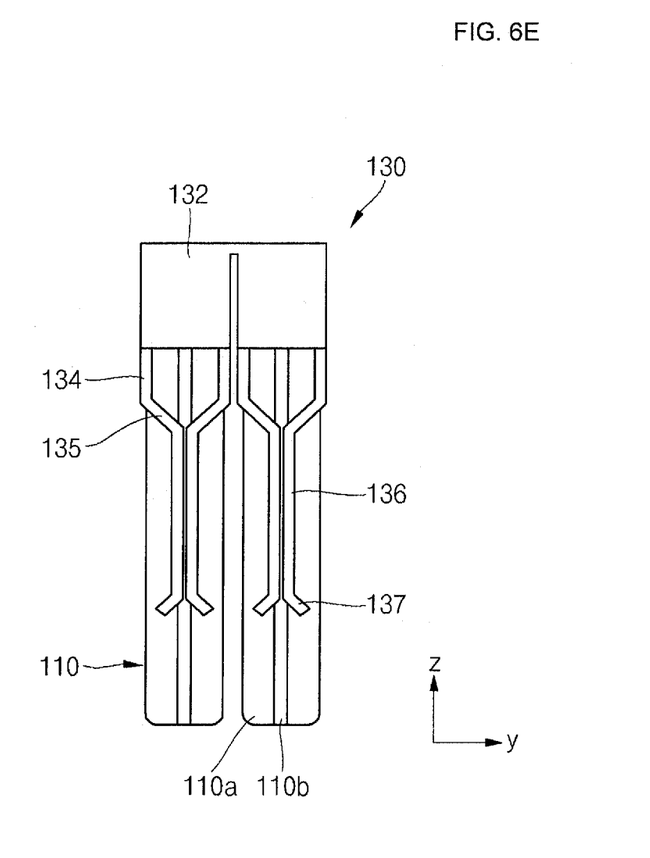

Referring to FIGS. 5, 6D and 6E, in step S30, the current collector 130 is coupled to the provisionally welded uncoated portion 110b. In one embodiment, the current collector 130 is provided as a pair to then be connected to the uncoated portions 110b having different polarities positioned at opposite edges of the coated portion 110a. In addition, one current collector 130 includes a plurality of coupling parts 136 to be connected to the uncoated portions 110b of the plurality of electrode assemblies 110. Since two electrode assemblies 110 are illustrated in the embodiment of the present invention, two coupling parts 136 are connected to one current collector 130. However, the present invention does not limit the number of the coupling parts 136 to that disclosed herein. In some embodiments, the current collector 130 is preferably formed of an elastic material.

According to some embodiments, the current collector 130 includes a plate part 131, one or more body parts 132, first bent parts 133, second bent parts 134, elastic parts 135, coupling parts 136 and extension parts 137, which are the same as described above and a detailed description thereof will not be provided again. In addition, since the body parts 132, the first bent parts 133, the second bent parts 134, the elastic parts 135, the coupling parts 136 and the extension parts 137 are symmetrically formed at both ends of the side of the plate part 131, the following description will be made with regard to the respective components formed at one end only.

The elastic parts 135 are connected to both ends of the side of the body part 132 not connected to the plate part 131 to then extend toward an extension line corresponding to the center of the body part 132. In other words, the elastic parts 135 may extend from the body part 132 towards each other. In some embodiments, the coupling parts 136 extend from the elastic parts 135 to be parallel to the uncoated portion 110b. In further embodiments, the extension parts 137 extend from the coupling parts 136 in a direction away from each other. In other words, the extension parts 137 are formed to extend away from the extension line corresponding to the center of the body part 132. Here, each of the elastic parts 135, the coupling parts 136 and the extension parts 137 are provided in pairs. The pair of coupling parts 136 are brought into contact with each other before they are coupled to the uncoated portions 110b. When the current collector 130 and the uncoated portions 110b are ready to be coupled to each other, the pair of extension parts 137 are pulled in opposite directions, thereby forming a space between the coupling parts 136. The uncoated portions 110b are then inserted into the space between the coupling parts 136 such that the opposite side surfaces of the uncoated portions 110b correspond to the pair of coupling parts 136. Once the uncoated portion 110b is inserted into the space between the pair of coupling parts 136, a pulling force that was being applied to the extension parts 137 is released, thereby making the coupling parts 136 and the uncoated portions 110b come into contact with each other. In one embodiment, the elastic parts 135 are made of an elastic material, and may allow the pair of coupling parts 136 to be easily pulled away from each other by compressing the elastic parts 135. After the uncoated portions 110b and the coupling parts 136 are coupled to each other, an elastic force restores the elastic parts 135 to their original states. Therefore, the coupling parts 136 press on the opposite side surfaces of the uncoated portion 110b with the force exerted by the elastic parts 135. Eventually, the uncoated portions 110b are brought closer to each other by the elastic parts 135, thereby minimizing formation of a gap between the uncoated portions 110b.

Figure 6F:
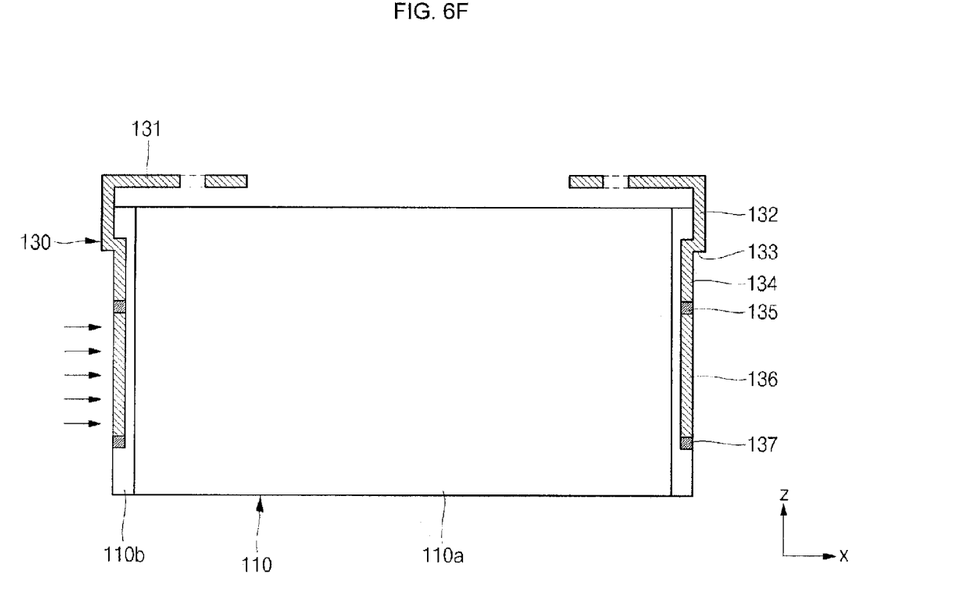

Referring to FIGS. 5 and 6F, in step S40, the uncoated portion 110b and the current collector 130 are welded to each other by laser welding. Here, the coupling parts 136 and the uncoated portion 110b are welded to each other using laser beams irradiated in a direction (x axis direction) perpendicular to the end of the uncoated portion 110b. Here, since the plurality of uncoated portions of the uncoated portion 110b are provisionally welded and the coupling parts 136 press on the opposite side surfaces of the uncoated portion 110b, it is possible to suppress a gap from being formed between the uncoated portions. Therefore, it is possible to substantially prevent laser beams from penetrating into the electrode assembly 110 through the gap between the uncoated portions during laser welding, thereby preventing the electrode assembly 110 from being damaged. In addition, since welding between the current collector 130 and the uncoated portion 110b is achieved at the end of the uncoated portion 110b by laser welding, it is possible to improve welding strength between the current collector 130 and the uncoated portion 110b having a width of approximately 2 mm or less.

The secondary battery according to the embodiment of the present invention may be manufactured by accommodating the electrode assembly 110 and the current collector 130 coupled to each other through the above-described steps in the case together with an electrolytic solution, covering the opening of the case to seal the case, and connecting the electrode terminal passing through the cap plate to the current collector 130.

As described above, in the manufacturing method of the secondary battery according to an embodiment of the present invention, weldability and welding strength between the uncoated portion and the current collector can be improved through a combination of ultrasonic welding and laser welding. Therefore, even if the uncoated portion 110b is formed to have a relatively narrow width of approximately 2 mm or less, welding between the uncoated portion and the coupling parts can be easily achieved. In some embodiments, in the welding of the uncoated portion to the current collector, the width of the uncoated portion is reduced to approximately 2 mm or less from approximately 4 mm or greater, as compared to a conventional electrode assembly, thereby increasing the width of the coated portion to 4 mm or greater. Therefore, the electrode assembly having a relatively large capacity can be attained. Alternatively, the electrode assembly reduced in size while having the same capacity can be attained by reducing only the width of the uncoated portion.

In addition, in the manufacturing method of the secondary battery according to the present embodiment of the present invention, the uncoated portion is provisionally welded by ultrasonic welding to be provisionally fixed, and then coupled to the elastic current collector. Here, the coupling parts press on the opposite side surfaces of the uncoated portions with a force exerted by the elastic parts, thereby substantially preventing a gap from being formed between the uncoated portions. Therefore, when coupled regions of the uncoated portions and the coupling parts are then welded by laser welding, it is possible to substantially prevent laser beams from penetrating into the electrode assembly and causing damages to the electrode assembly.

The secondary battery and the manufacturing method thereof according to exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present disclosure as set forth in the following claims and equivalents thereof.

What is claimed is:

1. A secondary battery comprising:
   at least one electrode assembly comprising an uncoated portion;
   a current collector having an elastic property and coupled to the uncoated portion; and
   a case accommodating the electrode assembly,
   wherein the uncoated portion is laser welded to coupling parts of the current collector, and
   wherein the current collector further comprises:
   at least one body part facing an end of the uncoated portion;
   a pair of elastic parts, each one of the elastic parts extending from a respective end of the at least one body part and being bent toward another one of the elastic parts;
   wherein the coupling parts comprise a pair of coupling parts, each one of the pair of coupling parts extending from a respective one of the pair of elastic parts and directly contacting the uncoated portion, the pair of coupling parts being entirely spaced from the at least one body part and elastically biased toward each other by the elastic parts such that each coupling part exerts a force against the uncoated portion and towards the other coupling part, and
   a pair of extension parts, each one of the pair of extension parts extending from a respective one of the pair of coupling parts and bending in a direction away from the other one of the pair of coupling parts such that each of the extension parts is spaced from the uncoated portion contacted by the coupling parts,
   wherein the uncoated portion comprises a plurality of uncoated portions stacked and welded together by ultrasonic welding.

2. The secondary battery as claimed in claim 1, wherein the uncoated portion directly contacts the coupling parts of the current collector.

3. The secondary battery as claimed in claim 1, wherein the uncoated portion has a width of approximately 2 mm or less.

4. The secondary battery as claimed in claim 1, wherein the coupling parts press on the opposite side surfaces of the uncoated portion.

5. The secondary battery as claimed in claim 1, wherein the current collector comprises a number of body parts equal to a number of electrode assemblies.

6. The secondary battery as claimed in claim 1, wherein the uncoated portion and the current collector are laser welded to each other using laser beams irradiated in a direction perpendicular to the end of the uncoated portion.

* * * * *